United States Patent [19]

Keys

[11] Patent Number: 5,419,183

[45] Date of Patent: *May 30, 1995

[54] METHODS AND APPARATUS USING A HYDROCARBON GEL TO ISOLATE MAINLINE VALVES IN A PIPELINE DURING A HYDROTEST

[75] Inventor: Mark S. Keys, Missouri City, Tex.

[73] Assignee: HydroChem Industrial Services, Inc., Houston, Tex.

[*] Notice: The portion of the term of this patent subsequent to Mar. 30, 2010 has been disclaimed.

[21] Appl. No.: 79,490

[22] Filed: Jun. 18, 1993

[51] Int. Cl.⁶ .............................. G01M 3/02
[52] U.S. Cl. .................. 73/49.5; 73/40.5 R; 73/49.1; 73/49.8
[58] Field of Search ............ 73/40.5 R, 49.5, 49.8, 73/49.1

[56] References Cited

U.S. PATENT DOCUMENTS 5,197,324  3/1993  Keys ................. 73/40.5 R

Primary Examiner—Hezron E. Williams
Assistant Examiner—Daniel S. Larkin
Attorney, Agent, or Firm—Browning, Bushman, Anderson & Brookhart

[57] ABSTRACT

In accordance with illustrative embodiments of the present invention, the existing valves in a crude oil, gas, or other product pipeline are positively sealed off to allow a pressure test to be made of a section or segment of the pipeline between the valves. The section is packed with a hydrocarbon or aqueous liquid. A mixture of a highly viscous hydrocarbon based gel material and a lost-circulation material are injected into the pipeline segment adjacent each valve to form plugs in the line. The gel plugs are squeezed under pressure against the internal components of each valve to cause all leakage paths therein to be bridged over and sealed off. The pipeline segment then is pressure tested to determine if there are any leaks therein, after which the gel is flushed out of the line and broken down into a linear pumpable state for disposal.

26 Claims, 1 Drawing Sheet

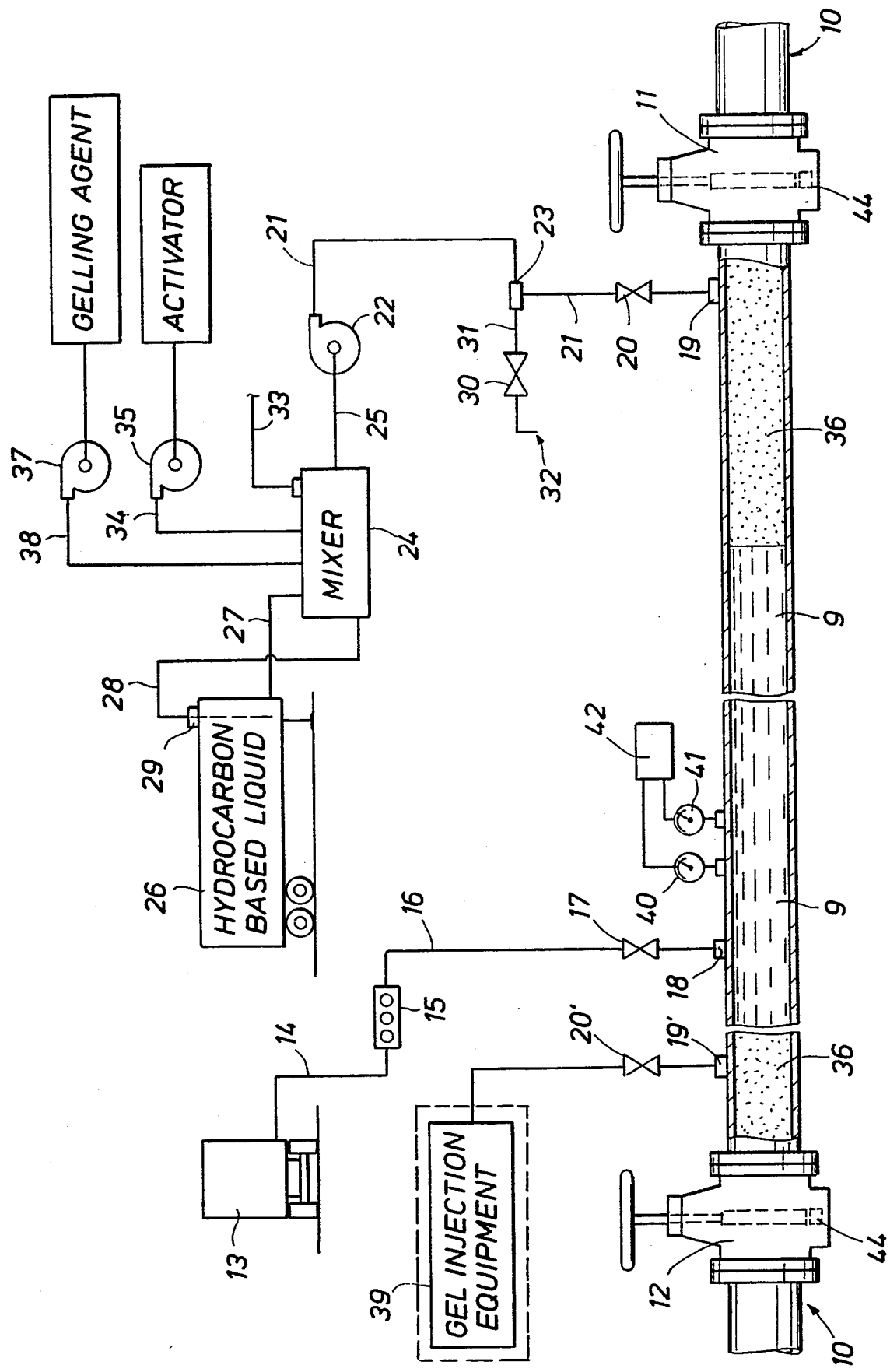

METHODS AND APPARATUS USING A HYDROCARBON GEL TO ISOLATE MAINLINE VALVES IN A PIPELINE DURING A HYDROTEST

This invention relates generally to the testing of a section or segment of an oil, gas, or other product pipeline, which has existing valves at the opposite ends of the segment, with a hydrocarbon liquid or water under pressure (hereafter referred to as "testing" or "pressure testing"). More particularly the present invention relates to new and improved methods and apparatus for positively sealing off any leaks in such valves so that the line segment may be tested in a reliable, efficient and economical manner.

BACKGROUND OF THE INVENTION

A large diameter pipeline that is used to convey fluid products such as crude oil or gas over long distances, for example between an oil field and a refinery, between pipelines or between unloading facilities and storage terminals, must occasionally be tested to confirm that there are no leaks in the line which could pose a hazard to the environment, waterways or to individuals or property along the route. Testing also must be performed on all operational pipelines after a leak has been located and repaired, or as required by regulation.

To test a pipeline, a procedure generally known as pressure testing may be used. This involves pressurizing a hydrocarbon liquid in the line to a predetermined value, and monitoring the pressure and temperature of the liquid in the line to determine if there are any leaks. Although a test of an entire pipeline system conceivably could be accomplished in a single operation, it is more typical for a series of independent tests to be made of relatively short-length segments thereof. The pipeline system is typically divided into segments by existing valves. These valves may be anywhere from a few feet to several miles apart. Since testing involves temporary shut-down of the pipeline, which adversely impacts the operation of refineries, terminals and other facilities which depend upon its throughput, there is a compelling need to conduct testing operations as quickly, reliably and economically as possible.

To conduct a meaningful test of a pipeline segment, there must be assurance that the test segment is positively isolated. If the valves that are used to isolate the test segment leak during the test, it is not possible to determine from pressure and temperature data whether the pipeline segment itself will hold pressure or not. Therefore some means should be provided to positively seal off these valves during the test so that if the test pressure drops off, the leak must be somewhere in the segment, not at a valve.

In the past, one process that has been used involved cutting the pipeline and installing test headers to isolate the mainline valves during testing. This procedure is very labor intensive and costly, takes a considerable amount of time, and is destructive to the pipeline. Another technique required blind flanges or a thin metal plate to be inserted between existing flanges. However, this labor intensive method might require draining the line product before installation of the "blinds". Thus the problem of providing a quickly implemented, economical and reliable way to positively seal off a mainline, a branch line or a cross-over valve during a test of a pipeline segment remains unsolved.

An object of the present invention is to provide new and improved methods and apparatus for positively sealing off existing valves in a pipeline which obviates the foregoing problems and difficulties with prior schemes.

Another object of the present invention is to provide new and improved methods and apparatus of the type described where a hydrocarbon gel mixture that can be easily injected into, and removed from, an inner region of a pipeline adjacent an existing valve is used to positively seal off the valve during a pressure test.

Still another object of the present invention is to provide new and improved methods and apparatus of the type described where a hydrocarbon-based highly viscous gel having a lost-circulation material suspended therein is injected into the pipeline adjacent existing valves. The injected gel bridges over and seals off any leakage paths in the valve so that a segment of a pipeline having the valve therein can be tested.

SUMMARY OF THE INVENTION

These and other objects are attained in accordance with the concepts of the present invention through the provision of a pipeline testing procedure where a segment or section of the pipeline contained within existing valves is filled or packed with a hydrocarbon liquid under pressure and then each of the valves is sealed off by injecting a mixture of a hydrocarbon liquid-based, highly viscous crosslinked gel and a lost-circulation material into the interior of the pipeline segment at locations adjacent each valve to form gel plugs at each location. The gel plugs squeeze against the respective valve elements and their seats. If any leakage paths are present therein, the gel will extrude through the leaks and lost circulation material will bridge over and seal off all such paths so that water or hydrocarbon pressure can be maintained within the interior of the line segment during the test, unless, of course, the segment leaks. After completion of the test, the respective gel plugs are flushed out of the line, for example, by opening the point of injection and allowing the water or hydrocarbon liquid to displace the gel under pressure into a nearby tank or transport truck. After flushing, no appreciable solid matter is left in the pipe. Then the gel is broken down into a linear pumpable state so that it may be disposed of in an environmentally sound manner.

BRIEF DESCRIPTION OF THE DRAWINGS

The present invention has other objects, features and advantages which will become more clearly apparent in connection with the following detailed description of the presently preferred embodiment, taken in conjunction with the appended drawing.

The single drawing FIGURE is a schematic illustration of a segment of a pipeline being tested in accordance with the present invention.

DETAILED DESCRIPTION OF PREFERRED EMBODIMENTS

With reference to the drawing FIGURE, a section or segment 9 of a pipeline 10, which may, for example, have a diameter in the order of about 2-48 inches or more, is shown as having existing valves 11 and 12 connected at the opposite ends thereof. The valves 11 and 12 typically could be a variety of valve types, i.e., gate, ball, plug and the like, which may be equipped with typical block and bleed ports 44. The pipeline 10 may be from several feet to many miles long, and a large number of the valves 11 and 12 may exist to divide the line into a large number of individual segments 9. Each segment 9 may be, for example, from a few feet to several miles long, dependent on elevation changes along the line and other factors. As is well known to those familiar with this art, the large size existing valves 11 and 12 have a propensity to leak due to age, corrosion, debris or defect, to an extent which will prevent testing of the pipeline segment 9 unless something is done to prevent leakage of the valves. Of course if either of the valves 11 or 12 leaks into an adjacent section of the pipeline, there is no way to determine from pressure and temperature data taken from the segment 9 whether there is a leak therein or not.

In accordance with this invention, however, the valves 11 and 12 are sealed off by injecting a gel plug into the segment 9 adjacent each valve which enables a meaningful pressure test of the segment to be performed.

For purposes of simplification, the right side of the drawing shows only those equipment components which are used to isolate the existing valve 11. It will be recognized that an identical set of equipment components 39 also is located adjacent the other valve 12 and used to isolate it in the same way. Two crews may be employed to operate both sets of equipment simultaneously or one crew may seal off the valve 11 and then shut-down and seal off the other valve 12, or vice-versa. After each of the valves 11 and 12 has been sealed off, then a test can be made of the pressure integrity of the segment 9 using the equipment components shown at the top center of the FIGURE.

The test components that are used in connection with the present invention include a tank 13 that is filled with hydrocarbon liquid or water and connected by a line 14 to a pump 15 whose discharge side is connected to the interior of the segment 9 by a flow line 16, a control valve 17 and a coupling such as a hot tap 18. The pump 15 usually is a positive displacement device such as a multi-plex pump. Gauges 40 and 41 are used to monitor the pressure and temperature of the hydrocarbon liquid in the segment 9, and a recorder 42 may be used to provide a test record. These can be located in the near vicinity of one of the valves 11 or 12, or somewhere along the segment 9 near the center thereof.

The gel plug injection equipment includes another hot tap 19 or the like, which is made a short distance (for example about 1–2 feet) from the existing valve 11. The tap 19 connects a control valve 20 and a line 21 to the discharge side of a pump 22 via a tee 23. The pump 22 is connected to the outlet of a batch mixer 24 by a flow line 25, and the mixer is connected to a drain outlet on a tank 26 by another line 27. The tank 26 has a fairly large capacity, and initially is filled with hydrocarbon liquids. A valve 30 and a line 31 from the tee 23 in the flow line 21 are used to provide a sampling point 32 where certain characteristics of the gel being pumped into the interior of the pipeline segment 9 through the line 21, the valve 20 and the hot tap 19 can be monitored.

A gel mixture that is formed by operation of the above components is injected into the interior of the pipeline segment 9 through the hot tap 19 to provide a gel "plug" 36 adjacent the mainline valve 11. The gel comprises an organic gel including a non-polar, liquid hydrocarbon and a gelling amount of a gelling agent mixture of a phosphate ester component which is composed predominately of ethyl oleic phosphate and an alkali metal aluminate to form a product that is viscoelastic and cohesive. These types of gels are more fully described in U.S. Pat. No. 4,537,700 which is incorporated herein by reference. The preferred liquid hydrocarbons are crude oil, diesel, kerosene, or other normally liquid, aromatic or aliphatic hydrocarbons or chlorinated derivatives thereof. The mixture further includes a suspended lost-circulation material, which preferably consists of cellophane or polyester flakes or chips. Although cellophane flakes or chips are the preferred lost-circulation material, other materials that may be used are sawdust, cracked pepper, naphtha, small mothballs or waxy resin beads. Other flake, granular and fibrous substances well known to those skilled in the art as lost circulation materials also may be used.

The gelling agent may be mixed with the hydrocarbon liquid at the mixer 24 via a pump 37 through an injection line 38 to provide a concentration range of from about 15–50 gallons gelling agent per 1,000 gallons gel. An activator also may be added to form the viscoelastic characteristics of the gel at the mixer 24 via a pump 35 through an injection line 34 to provide a concentration range of from about 15–50 gallons activator per 100 gallons gel. Alternatively, the gelling agent and activator may be added to tank 26. In this alternative, circulating line 28 goes from the mixer 24 through an access port 29 in the top of the tank 26 and extends down to near the bottom wall thereof as shown in dotted lines. In this manner the lines 27 and 28 and an auxiliary pump (not shown) in the mixer 24 may be used to circulate between the tank 26 and the mixer 24 to mix the gelling agent, activator or other substances and additives with the hydrocarbon liquid in the tank. The lost-circulation material is added at the mixer 24 as indicated by the arrow 33, preferably in a range from about 0.25 to about 1 percent-by-weight. The alkali metal aluminate is added to the mixture through line 34 and pump 35.

The gel is pumped by pump 22 through line 2 1, control valve 20 and hot plug 19 and is injected into the segment 9 in a selected volume such that the plug 36 has an appropriate length, e.g., about 50 feet or more if needed. When injection of the plug 36 is completed the pump 22 is shut down and the valve 20 is closed. A similar gel plug 36 is formed adjacent valve 12 through hot plug 19' and control valve 20' in fluid communication with substantially identical gel injection equipment 39. The hydrocarbon liquid in the segment 9 then is pressurized through operation of the pump 15, which squeezes the gel against the internal components of the valve 11 so that it seeks out and bridges over any leaks therein. The pipeline segment 9 then can be pressure tested with assurance that any leaks which are discovered are in the segment rather than in a valve.

OPERATION AND USE

To pressure test a segment 9 of the pipeline 10, the fluid product in the segment may be left in the pipeline segment; alternatively, the fluid product may be replaced by water or another liquid hydrocarbon. All existing valves to contain the segment are closed. The liquid is "packed" into the segment 9 by pressurizing to a pressure which will ensure that there are no compressed air pockets therein, but well below the test pressure, e.g., to half the test pressure The gel is injected into the interior of the segment 9 at each end thereof adjacent the test sides of the respective valves 11 and 12 as shown in the FIGURE. The basic gel mixture is formed in the mixer 24 combining the gelling agent, activator and lost circulation material with the hydrocarbon liquid therein. The proper amount of gelling agent is added to the mixer 24 by using the pump 37 and flow line 38. The proper amount of activator is supplied to the mixer 24 by using the pump 35 and the flow line 34, which causes substantially immediate gellation. The proper amount of lost circulation material also is dumped into the mixer 24 and is held in suspension by the constituents of the gel. The pump 22 is operated at the necessary pressure to inject a predetermined volume of gel and suspended lost-circulation material into the line segment 9 adjacent the valve 11. As mentioned above, the preferred length of the plug 36 may be about fifty (50) feet or more in a 2-48 inch diameter pipeline, dependent upon the size of the leakage at the valve.

After the pump 22 is shut down and the valve 20 closed the pressure is raised to the predetermined test pressure, generally in the range of 200-500 psi, by operating the pump 15 or a smaller unit. If there are any leaks in the internal parts of the valve 11, the right end of the plug 36 will be squeezed against the valve and will seek out and flow into all leakage paths that exist. In short order, these leakage paths will be bridged over by the lost-circulation material as the gel migrates through any leaks to form a bubble- tight seal. The pipeline segment 9 then may be tested by applying pressure thereto with the pump 15. Test pressures and temperatures are monitored on a continuous basis by the gauges 40 and 41 and are recorded at 42.

A drop in test pressure over a period of time which cannot be correlated with a temperature change indicates that there is a leak somewhere in the segment 9 that needs to be located and repaired. If the test pressure holds steady over a number of hours, it can be concluded that the segment 9 has no leaks which need attention. When the test is completed, a vent, e.g., one associated with the 2 inch control valve 17 is opened to bleed down the pressure in the line segment 9. The head or break tank 13 and the pump 15 of the test unit may be located near the center of the segment 9, or a fairly short distance from one of the valves 11 or 12 and may be a pump dedicated to the pressure test or contract or an existing facility pump.

After the pressure test is completed, each gel plug 36 is flushed out of the segment 9 at each end and into an available transport tank by opening an available flow port, for example, the 2 inch injection valve 20 near the mainline valve 11, or pumped out the injection valve 20. The plug at the other end of the segment 9 also may be removed through components 19' and 20'. After removal, the gel is broken down into a linear pumpable state.

Although not shown in the FIGURE, other valves in the system which typically are found along the pipeline segment may be sealed off in the same manner as disclosed above. Where a bypass valve or a branch line valve is located fairly close to one of the existing valves 11, 12, both valves may be sealed off simultaneously by using the same gel plug 36, although it may have to be lengthened.

It now will be recognized that new and improved methods and apparatus have been disclosed for sealing off mainline, branch or bypass valves in a pipeline system so that individual segments thereof may be pressure tested in a quick, reliable and economical manner. These new methods avoid the installation and use of various expensive and destructive mechanical devices, e.g., test headers and/or blind flanges. After a test of the pipeline segment is completed, the gel plug may be flushed out, broken down and disposed of in an environmentally sound manner.

Since certain changes or modifications may be made in the disclosed embodiment without departing from the inventive concepts involved, it is the aim of the appended claims to cover all such changes and modifications falling within the true spirit and scope of the present invention.

What is claimed is:

1. A method of sealing off a valve at one end of a segment of a pipeline which carries a product to thereby enable said segment to be pressure tested comprising the steps of: filling said segment with a hydrocarbon liquid and then closing said valve; injecting a selected quantity of a highly viscous hydrocarbon based gel having a lost-circulation material suspended therein into said segment adjacent said valve; squeezing said gel and lost-circulation material into any leakage paths present in the internal components of said valve, and applying test pressure to said hydrocarbon liquid over a period of time to determine whether there are leaks in said segment of said pipeline.

2. The method of claim 1 wherein said lost-circulation material is constituted by cellophane flakes.

3. The method of claim 1 including the further steps of removing said gel from said segment; breaking down said gel into a linear pumpable state, and then disposing of said gel.

4. The method of claim 3 wherein said flushing step is carried out by opening a bleed port; and allowing pressure in said segment to cause said gel and lost-circulation material to be flushed out of the region adjacent said valve via said bleed port.

5. The method of claim 1 wherein said lost-circulation material is selected from a group comprising cellophane flakes, sawdust, cracked pepper, naphtha, mothball, waxy resin beads, and gilsonite.

6. The method of claim 1 wherein said lost circulation material is added to the gel in the range of 0.25-1% by weight.

7. A method of sealing off a valve at one end of a segment of a product pipeline to enable said segment to be pressure tested, comprising:
   closing said valve while said segment is filled with a fluid;
   injecting into said segment adjacent said valve a selected quantity of a highly viscous hydrocarbon-based gel in which a lost circulation material is suspended; and
   squeezing said gel and lost circulation material into any leakage paths through said valve.

8. The method of claim 7 wherein said lost circulation material is selected from the group consisting of flakes, chips, beads, granules and fibrous lost circulation materials.

9. The method of claim 8 wherein said lost circulation material is selected from the group consisting of sawdust, cracked pepper, naphtha, mothballs, waxy resin beads, cellophane and gilsonite.

10. The method of claim 9 wherein said lost circulation material is cellophane flakes.

11. The method of claim 7 wherein said lost circulation material comprises about 0.25-1.0 percent-by-weight of said gel.

12. The method of claim 7 wherein said gel comprises a non-polar, liquid hydrocarbon and a gelling amount of a gelling agent.

13. The method of claim 12 wherein said gelling agent is comprised of a phosphate ester and an alkali metal aluminate.

14. The method of claim 13 wherein said phosphate ester is ethyl oleic phosphate.

15. The method of claim 12 wherein said gelling agent comprises about 1.5–5.0 percent-by-volume of said gel.

16. The method of claim 12 wherein said liquid hydrocarbon is selected from the group consisting of aliphatic hydrocarbons, aromatic hydrocarbons and chlorinated derivatives thereof.

17. A method of pressure testing a segment of a product pipeline having at least one valve at one end thereof, comprising:
   closing said valve while said segment is filled with a fluid;
   injecting into said segment adjacent said valve a selected quantity of a highly viscous hydrocarbon-based gel in which a lost circulation material is suspended;
   squeezing said gel and lost circulation material into any leakage paths through said valve; and
   applying a known test pressure to said fluid to determine whether there are any leaks in said segment of said pipeline.

18. The method of claim 17 wherein said test pressure is applied and monitored over a period of time.

19. The method of claim 17 further comprising flushing said gel out of said segment, converting said gel into a linear pumpable state, and disposing of said gel.

20. The method of claim 19 wherein said gel is flushed from said segment by pumping.

21. The method of claim 19 wherein said gel is flushed from said segment through said valve after opening said valve.

22. The method of claim 19 wherein said gel is flushed from said segment through a bleed port in said segment adjacent said valve after opening said bleed port.

23. The method of claim 17 wherein said fluid is a liquid selected from the group consisting of hydrocarbon and aqueous liquids.

24. The method of claim 17 wherein said gel comprises a non-polar, liquid hydrocarbon and a gelling amount of a gelling agent.

25. A method of pressure testing a segment of a product pipeline having at least one valve at one end thereof, comprising;
   filling said segment with a fluid;
   closing said valve while said segment is filled with said fluid;
   injecting into said segment adjacent said valve a selected quantity of a highly viscous hydrocarbon-based gel comprising a non-polar, liquid hydrocarbon, a gelling amount of a gelling agent and a lost circulation material suspended in said gel;
   squeezing said gel and lost circulation material into any leakage paths through said valve; and
   applying a known pressure to said fluid to determine whether there are any leaks in said segment of said pipeline.

26. The method of claim 25 wherein
   said liquid hydrocarbon is selected from the group consisting of aliphatic hydrocarbons, aromatic hydrocarbons and chlorinated derivatives thereof;
   said gelling agent comprises about 1.5–5.0 percent-by-volume of said gel and comprises a phosphate ester and an alkali metal aluminate; and
   said lost circulation material comprises about 0.25–1.0 percent-by-weight of said gel and is selected from the group consisting of flakes, chips, beads, granules and fibrous matter selected from the group consisting of sawdust, cracked pepper, naphtha, mothballs, waxy resin beads, cellophane and gilsonite.

* * * * *

UNITED STATES PATENT AND TRADEMARK OFFICE
CERTIFICATE OF CORRECTION

PATENT NO. : 5,419,183
DATED : May 30, 1995
INVENTOR(S) : Mark S. Keys

It is certified that error appears in the above-indentified patent and that said Letters Patent is hereby corrected as shown below:

In the left column of the title page, delete the Notice at "[*]", and in its place substitute:

--[*] Notice: The portion of the term of this patent subsequent to February 12, 2012, the maximum statutory term of U.S. Patent No. 5,197,324, has been disclaimed.--

Signed and Sealed this

Third Day of September, 1996

Attest:

BRUCE LEHMAN

Attesting Officer

Commissioner of Patents and Trademarks